United States Patent

Barnabo et al.

(10) Patent No.: US 7,356,697 B2
(45) Date of Patent: Apr. 8, 2008

(54) SYSTEM AND METHOD FOR AUTHENTICATION TO AN APPLICATION

(75) Inventors: Christopher E. Barnabo, Bethel, CT (US); Gordan G. Greenlee, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 10/600,215

(22) Filed: Jun. 20, 2003

(65) Prior Publication Data

US 2004/0260925 A1    Dec. 23, 2004

(51) Int. Cl.
*H04L 9/00* (2006.01)
(52) U.S. Cl. ...................................... 713/168
(58) Field of Classification Search ................ 713/168
See application file for complete search history.

(56) References Cited

U.S. PATENT DOCUMENTS

| | | | |
|---|---|---|---|
| 5,586,260 A | 12/1996 | Hu | 395/200.2 |
| 5,872,915 A | 2/1999 | Dykes et al. | 395/188.01 |
| 5,889,958 A | 3/1999 | Willens | 395/200.59 |
| 5,908,469 A | 6/1999 | Botz et al. | 713/201 |
| 5,915,008 A | 6/1999 | Dulman | 379/201 |
| 5,987,232 A | 11/1999 | Tabuki | 395/187.01 |
| 6,052,710 A | 4/2000 | Saliba et al. | 709/203 |
| 6,052,730 A | 4/2000 | Felciano et al. | 709/225 |
| 6,061,794 A | 5/2000 | Angelo et al. | 713/200 |
| 6,119,149 A * | 9/2000 | Notani | 709/205 |
| 6,199,113 B1 * | 3/2001 | Alegre et al. | 709/229 |
| 6,226,752 B1 | 5/2001 | Gupta | 713/201 |
| 6,230,012 B1 | 5/2001 | Willkie et al. | 455/435 |
| 6,233,618 B1 | 5/2001 | Shannon | 709/229 |
| 6,289,385 B1 * | 9/2001 | Whipple et al. | 709/229 |
| 6,317,798 B1 | 11/2001 | Graf | 710/15 |
| 6,317,838 B1 | 11/2001 | Baize | 713/201 |
| 6,324,648 B1 * | 11/2001 | Grantges, Jr. | 726/12 |
| 6,332,155 B1 * | 12/2001 | Notani | 709/205 |

(Continued)

FOREIGN PATENT DOCUMENTS

JP    2000330937    11/2000

OTHER PUBLICATIONS

Roy et al., Oracle iMeeting, Nov. 2001, Oracle.*

(Continued)

*Primary Examiner*—Gilberto Barrón, Jr.
*Assistant Examiner*—David Garcia Cervetti
(74) *Attorney, Agent, or Firm*—Arthur J. Samodovitz (57) ABSTRACT

Authenticating a first user in a protected network to an application in a DMZ network shared simultaneously with a second user in an unprotected network. The first user supplies a userID and a password to a first server within the protected network for authentication for the application. The first sewer checks authentication of the first user based on the userID and password. If the first user is authentic, the first server forwards to the application an authentication key for the first user and a selection by the first user pertaining to the application. The application checks authentication of the key, and if authentic, complies with the selection by the first user. The second user supplies another userID and another password to the application. If the other userID and other password are authentic, the application complies with a selection made by the second user pertaining to the application.

22 Claims, 7 Drawing Sheets

U.S. PATENT DOCUMENTS

| | | | |
|---|---|---|---|
| 6,334,146 B1 * | 12/2001 | Parasnis et al. | 709/217 |
| 6,385,730 B2 | 5/2002 | Garrison | 713/202 |
| 6,397,191 B1 * | 5/2002 | Notani et al. | 705/9 |
| 6,510,464 B1 * | 1/2003 | Grantges et al. | 709/225 |
| 6,567,783 B1 * | 5/2003 | Notani et al. | 705/9 |
| 6,567,813 B1 * | 5/2003 | Zhu et al. | 707/100 |
| 6,754,181 B1 * | 6/2004 | Elliott et al. | 370/252 |
| 6,791,582 B2 * | 9/2004 | Linsey et al. | 715/751 |
| 6,901,448 B2 * | 5/2005 | Zhu et al. | 709/228 |
| 6,988,126 B2 * | 1/2006 | Wilcock et al. | 709/204 |
| 7,039,597 B1 * | 5/2006 | Notani et al. | 705/9 |
| 7,069,298 B2 * | 6/2006 | Zhu et al. | 709/204 |
| 7,069,334 B2 * | 6/2006 | Wysoczynski | 709/232 |
| 7,107,285 B2 * | 9/2006 | von Kaenel et al. | 707/104.1 |
| 7,111,323 B1 * | 9/2006 | Bhatia et al. | 726/8 |
| 7,130,883 B2 * | 10/2006 | Zhu et al. | 709/204 |
| 7,197,751 B2 * | 3/2007 | Fedotov et al. | 719/323 |
| 7,203,755 B2 * | 4/2007 | Zhu et al. | 709/227 |
| 7,206,811 B2 * | 4/2007 | Skurikhin et al. | 709/205 |
| 2002/0055973 A1 * | 5/2002 | Low et al. | 709/204 |
| 2002/0059425 A1 * | 5/2002 | Belfiore et al. | 709/226 |
| 2002/0065912 A1 * | 5/2002 | Catchpole et al. | 709/224 |
| 2003/0046586 A1 * | 3/2003 | Bheemarasetti et al. | 713/201 |
| 2003/0120593 A1 * | 6/2003 | Bansal et al. | 705/39 |
| 2003/0208448 A1 * | 11/2003 | Perry et al. | 705/64 |
| 2003/0220768 A1 * | 11/2003 | Perry et al. | 702/188 |
| 2003/0229805 A1 * | 12/2003 | Perry | 713/200 |
| 2004/0117358 A1 * | 6/2004 | von Kaenel et al. | 707/3 |
| 2004/0267938 A1 * | 12/2004 | Shoroff et al. | 709/227 |

OTHER PUBLICATIONS

Research Disclosure—Aug. 1998 Using an Organization's Existin Gsecurity Mechanism fo Rweb-Based Applications.

Research Disclosure—Mar. 2000 "Voice Cybervault for Local and Internet Logins".

* cited by examiner

SYSTEM AND METHOD FOR AUTHENTICATION TO AN APPLICATION

FIELD OF THE INVENTION

The invention relates generally to computer networks, and deals more particularly with a technique to authenticate users from a protected intranet and unprotected network to a shared application.

BACKGROUND OF THE INVENTION

Communications often flow from one network to another, and usually some form of security is required between the networks. Security is often provided by user identifications or userIDs and passwords to authenticate a user, and a firewall to screen out unwanted messages. There are different types of networks, and the type of security depends on the types of networks involved in the communication. For example, there may be an intranet or "Blue zone" for local communications within an enterprise. It is presumed that all users of the intranet are trustworthy because they all work for the same enterprise. Therefore, usually there is relatively little security concern within the intranet, although userIDs and passwords are still required to access applications. However, oftentimes users of the intranet want to communicate with another entity located on another network, for example, a "Red zone" such as the Internet. Because this other entity may not work for the enterprise, and this other network is not under control of the enterprise, this other entity and network cannot be thoroughly trusted. It is possible that a user on this other network can attempt to learn a userID and password of a user within the firewall and then, using this userID and password, view or tamper with sensitive data within the firewall. Therefore, a firewall may be installed at the gateway to the intranet. The firewall is responsible for enforcing a security policy for incoming communications. This security policy may define which types of networks that the intranet is permitted to communicate and what protocols are permitted for the communications. The firewall also may (a) limit incoming traffic to certain source IP addresses and through certain firewall ports, (b) limit outgoing traffic to certain destination IP addresses and through certain firewall ports, and (c) detect viruses to thwart hackers.

For additional security, the enterprise that controls and uses the Blue zone intranet may also create and control a "Demilitarized zone" ("DMZ") or "Yellow zone" between the Blue zone and the Red zone. The Yellow zone would include one or more servers and respective data bases managed by the enterprise. However, the Yellow zone data bases typically would not include sensitive data or the only copy of sensitive data. Therefore, if the server(s) in the enterprise's DMZ are corrupted by a communication from another network, the damage is repairable. The firewall for the enterprise's intranet or Blue Zone may only permit communications with the enterprise's "Yellow Zone". The management of the servers and related devices in the enterprise's DMZ allows the enterprise a measure of security in the enterprise's DMZ. Therefore, the Yellow zone serves as a buffer for the Blue zone. The enterprise's DMZ may be authorized to communicate with an untrusted server or workstation in the "Red zone" directly or through another firewall. It is also possible to connect the enterprise's intranet with its firewall directly to one or more untrusted networks in a Red zone, and rely on the enterprise intranet's firewall to provide security.

Some applications support simultaneous participation from users located within a Blue zone and a Red zone. For example, an existing e-meeting application executes in a Yellow zone of a host enterprise and may involve participants from different companies. The participants from the host enterprise are in the Blue zone and the other participants are in the Red zone and access the e-meeting application. Currently, all the users, regardless of their location, must log-on with a userID and password. While this is effective in authenticating the users to the application, there is the potential for a hacker in the Red zone to learn the userID and password of a user in the Blue zone. With this userID and password, it would then be possible for the hacker to access sensitive data within the Blue zone.

Accordingly, an object of the present invention is to shield the Blue zone users' passwords from the Red zone users who can simultaneously access the same application in the Yellow zone.

SUMMARY OF THE INVENTION

The invention resides in a system, method and program product for authenticating a first user in a protected network to an application shared simultaneously with a second user in an unprotected network. The first user supplies a userID and a password to a first server within the protected network for authentication for the application. The application resides in a third network. The first server checks authentication of the first user based on the userID and password. If the first user is authentic, the first server forwards to the application an authentication key for the first user and a selection by the first user pertaining to the application. The application checks authentication of the key, and if authentic, complies with the selection by the first user.

According to one feature of the present invention, the protected network and the third network are both controlled by a same entity.

According to another feature of the present invention, the second user supplies another userID and another password to the application. If the other userID and other password are authentic, the application complies with a selection made by the second user pertaining to the application.

DETAILED DESCRIPTION OF THE PREFERRED EMBODIMENTS

Figure 1:
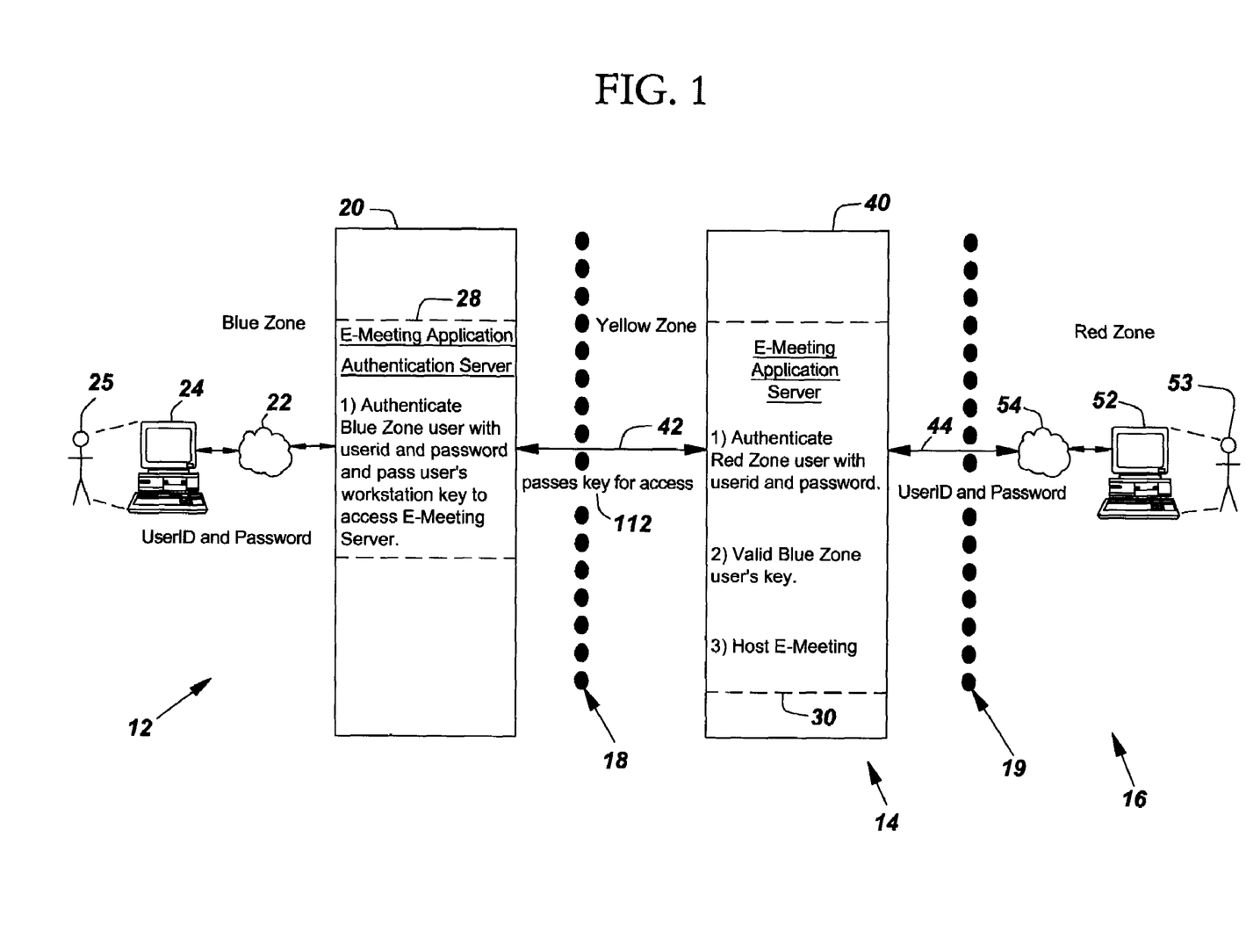
FIG. 1 is a block diagram of three, interconnected networks (Blue zone, Yellow zone and Red zone), and servers in a Blue zone network and a Yellow zone network which embody the present invention.

Referring now to the drawings in detail wherein like reference numbers indicate like elements, FIG. 1 illustrates intranet or Blue Zone network 12, DMZ or Yellow zone network 14 and internet or Red zone network 16. The Blue zone is connected to the Yellow zone through a firewall 18. Firewall 18 protects the Blue zone against unwanted incursions from the Yellow zone. The Yellow zone is connected to the Red zone through a firewall 19. Firewall 19 protects the Yellow zone against most unwanted incursions from the Red zone and monitors outgoing traffic. Firewall 18 and Firewall 19 are responsible for enforcing a security policy for incoming communications. This security policy may define which types of networks that the intranet is permitted to communicate and what protocols are permitted for the communications. The firewalls also may (a) limit incoming traffic to certain source IP addresses and through certain firewall ports, (b) limit outgoing traffic to certain destination IP addresses and through certain firewall ports, and (c) detect viruses to thwart hackers.

Blue zone network 12 comprises a server 20, connectivity hardware and software for intranet 22 and a multiplicity of work stations connected to the intranet 22. One such work station 24 and its user 25 are illustrated in FIG. 1. By way of example, the intranet 22 can utilize Hyper Text Transfer Protocal ("HTTP"), File Transport Protocol ("FTP"), User Datagram Protocol ("UDP"), Transmission Control Protocol/Internet Protocol ("TCP/IP"), IBM Lightweight Directory Access Protocol ("LDAP") or other IP protocols. By way of example, the user of work station 24 interacts with application 28 using HTTP protocol. Server 20 within the Blue zone is executing an application 28 which, as described below, participates in authenticating the user 25 within the Blue zone to a dual or multi-network application 30 within the Yellow zone. Application 28 can interact with application 30 using HTTP protocol.

Yellow zone network 14 comprises a server 40, and connectivity hardware and software 42 and 44 for the Blue zone and the Red zone, respectively. By way of example, the connectivity hardware and software 42 and 44 can utilize HTTP, FTP, UDP, TCP/IP, IBM LDAP or other IP protocols. Server 40, within the Yellow zone, is executing dual or multi-network application 30. As described below, application 30 participates in authenticating the user 25 within the Blue zone to application 30 and participates in authenticating a user 53 within the Red zone to application 30. Application 30 also provides a dual or multi-network function such as an electronic meeting ("e-meeting") function where different users simultaneously view a presentation of screens made by a leader, and simultaneously listen over the telephone to a verbal presentation related to the screen presentation. Typically (but not always), the leader resides in the Blue zone along with other participants, and the presentation screens are stored in the Blue zone. Typically also, the leader schedules the meeting and specifies who can participate in the meeting. Alternately, application 30 can provide an e-commerce function where users/exploiters from different zones can independently view products and or information such as pricing and ordering screens. Alternately, application 30 can provide typical interactive web application functions to users/exploiters from any zone provided they have been properly authenticated. Each of these functions supports participants from the Blue zone and or Red zone in either a common activity or when interacting independently with an application.

Red zone network 16 can be the internet/World Wide Web and comprises multiple servers and workstations. One such work station 52 and its user 53 are illustrated. None of the Red zone servers is shown because, in the illustrated embodiment, work station 52 can interact directly with Yellow zone server 40 via internet 54. However, if desired a Red zone server can be interposed between work station 52 and Yellow zone server 40 and serve as a conduit. By way of example, work station 52 interacts with Yellow zone server using HTTP protocol, although other protocols can be used as well.

Figure 2:
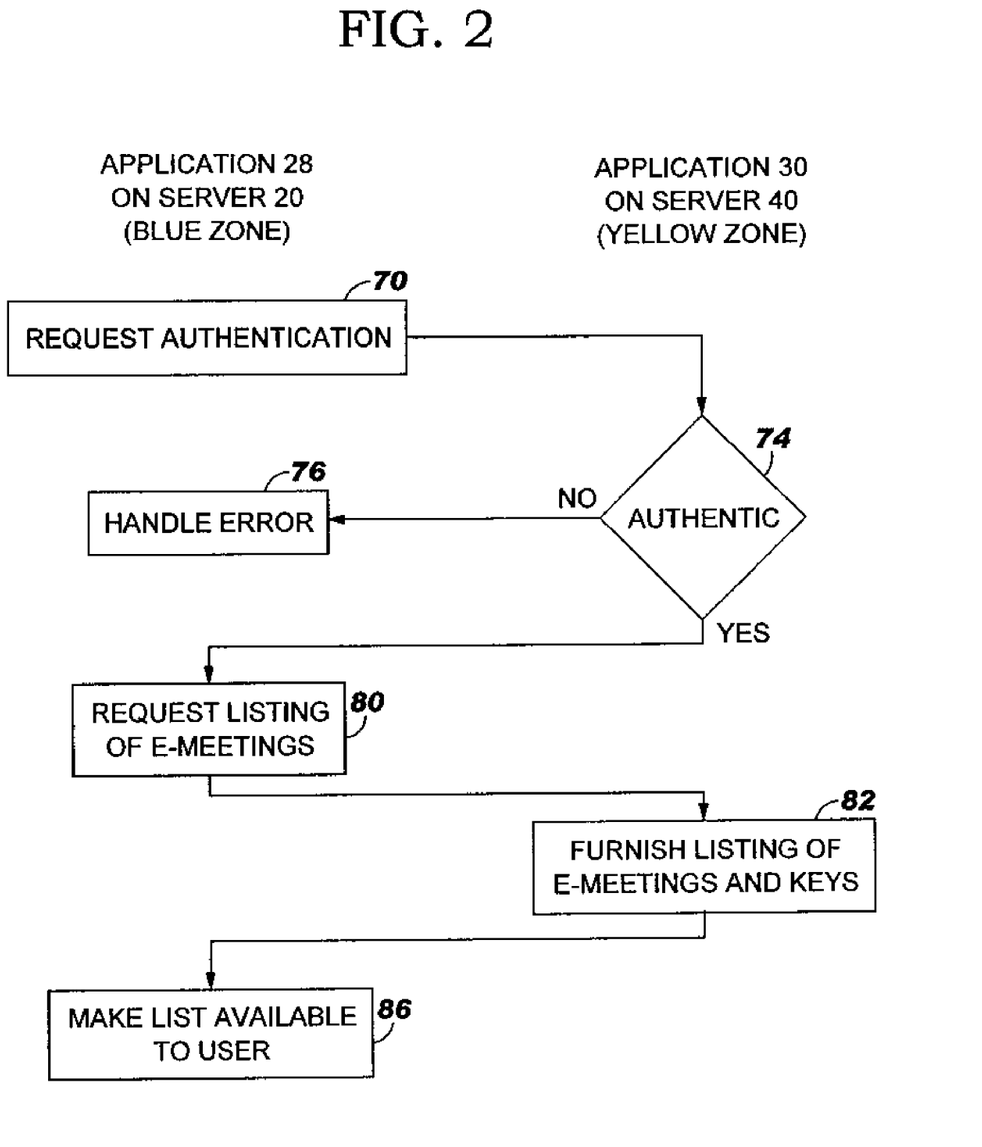
FIG. 2 is a flow chart illustrating a process for a server in the Blue zone to be authenticated to a server in the Yellow zone, and exchange information pursuant to the present invention.

FIG. 2 is a flow chart illustrating a process for a server in the Blue zone to be authenticated to a server in the Yellow zone, and exchange information pursuant to the present invention. In step 70, application 28 on Blue zone server 20 requests that it be authenticated to application 30 on Yellow zone server 40. This request is made by a key file exchange. This is done by the administrators when the servers are initially set up, so that not only does the Blue zone server identify itself to the Yellow zone server, but the Yellow zone server identifies itself to the Blue zone server. This cross challenge proves to each server the identity of the other server when the application is running. Application 30 checks the authentication by confirming the request is from a trusted source by decrypting the request with the key previously exchanged (decision 74). If the authentication fails, then application 30 notifies application 28, and application 28 notifies user 25 through normal failure messages (step 76). However, if the authentication succeeds, then application 28 can request a list of e-meetings scheduled for the day (or some other period of time) (step 80). In response to this request, application 30 will return a list of e-meetings and the authorized participants for each meeting. In the illustrated embodiment, application 30 also furnishes to application 28 an authentication key to be used subsequently by application 28 when user 25 requests participation in the e-meeting (step 82). (Alternately, as described below, the authentication key can be self authenticating based on its content, and need not be supplied previously from application 30.) After receiving the list of e-meetings and the authorized participants, application 28 can make this list available to the user to review (step 86). The user 25 may also receive by e-mail, an electronic meeting notice to learn of an e-meeting for which user 25 is authorized and requested to participate.

Figure 3A:
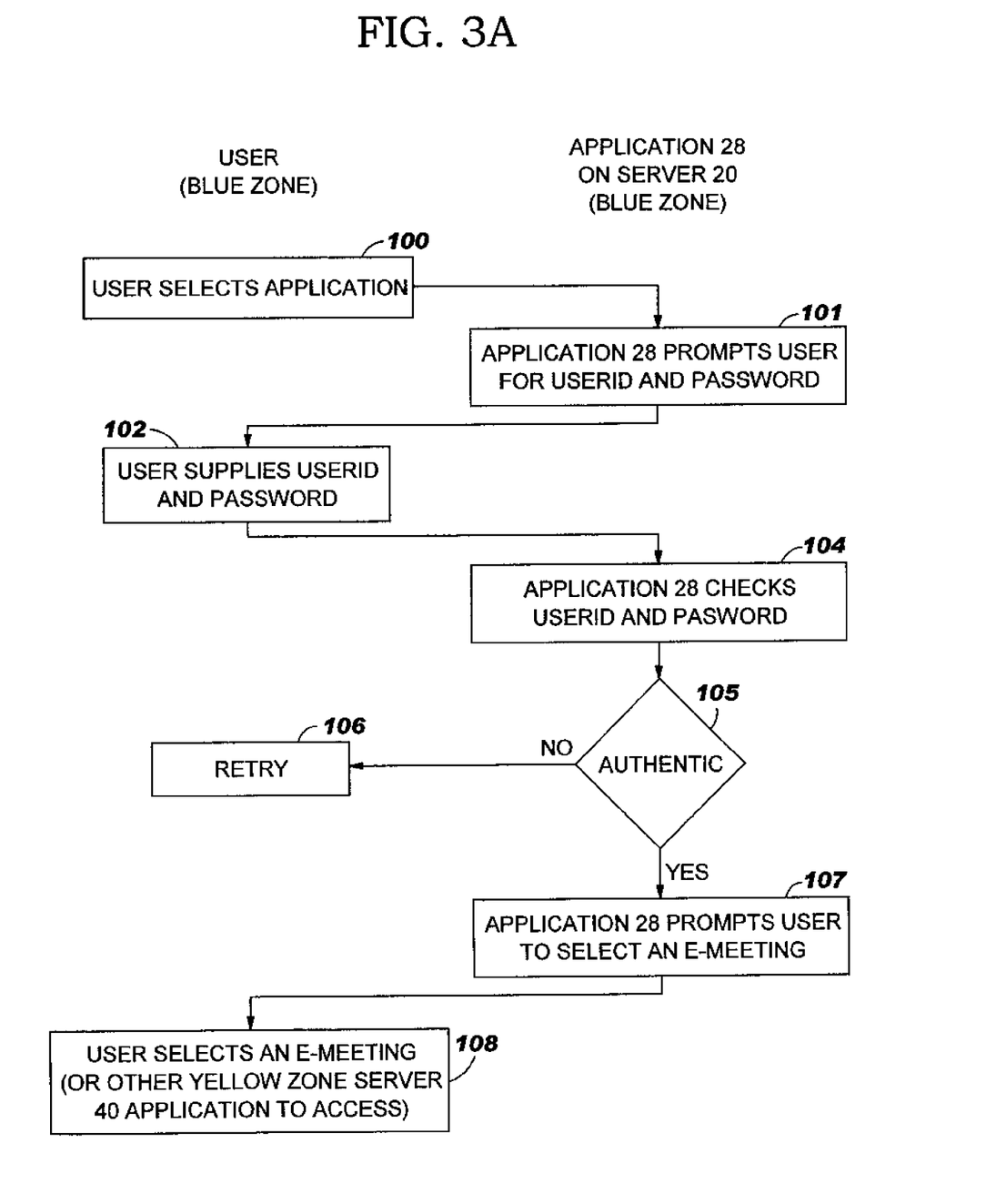
FIGS. 3(A), 3(B) and 3(C) form a flow chart illustrating a process for a user in the Blue zone to be authenticated with and use an application in the Yellow zone.

FIG. 3(A) illustrates a process to authenticate a user (such as user 25 on work station 24) in the Blue zone to application 28 on server 20 in the Blue zone. As explained below with reference to FIG. 3(B), after this authentication to application 28, application 28 will authenticate the user 25 to application 30 in the Yellow zone server 40 by furnishing to application 30 an authentication key. Referring again to FIG. 3(A), initially the user 25 selects an icon or intranet URL to invoke application 28 using HTTP (step 100). In response, application 28 prompts the user 25 for a conventional userID and password (step 101), and the user 25 complies (step 102). Then, application 28 checks the combination of userID and password against a list in a data base (decision 104). If the combination fails (decision 105), the user is so notified to try again (step 106). If the combination passes, then the user is considered authentic to application 28. In the case where application 28 is an e-meeting application, application 28 then prompts the user to select an e-meeting hosted by application 30 on server 40 in the Yellow zone to join (or select another application on server 40 to access) (step 107). The user 25 can now make the selection and this selection is temporarily stored in server 20 (step 108).

Figure 3B:
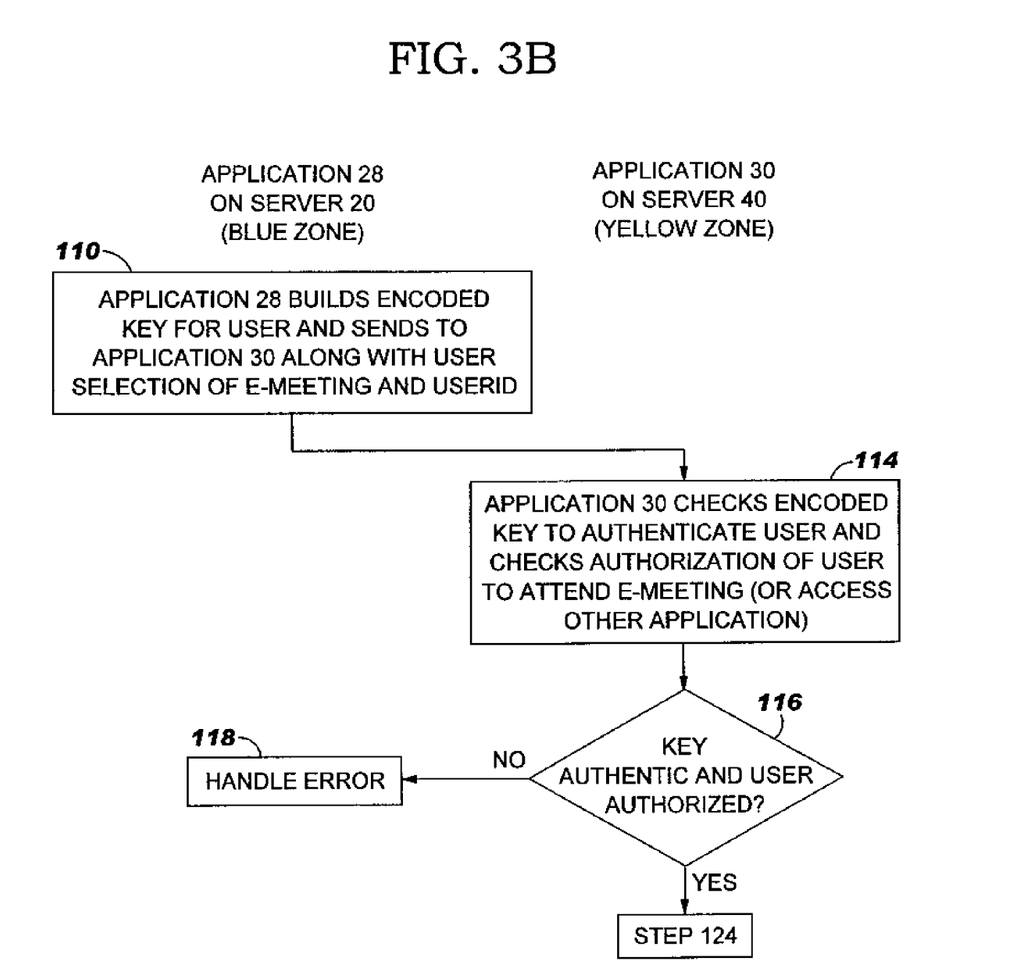

FIG. 3(B) illustrates the subsequent steps of application 28 authenticating user 25 in the Blue zone to application 30 in the Yellow zone. After the foregoing authentication of user 25 to application 28 with the userID and password, application 28 "builds" an authentication key 112 for user 25 and sends this key to application 30 along with the user 25 selection of the e-meeting to join (step 110). In the illustrated embodiment, this key includes the foregoing key supplied by application 30 to application 28 in step 82 of FIG. 2), along with the userID. This key obviates the need for application 28 to authenticate user 25 to application 30 so that the password of user need not be sent to application 30. By avoiding the need to send the password of user 25 into the Yellow zone, this prevents hackers in the Red zone from obtaining the password of user 25 by hacking into the Yellow zone server 40. The authentication key 112 may also contain information as to the identity of the e-meeting that the user wishes to join, a length of time during which the key is valid, and an IP address of user 25. Also, the authentication key can be encrypted. In the illustrated embodiment, application 28 was authenticated to application 30 and the authentication key was supplied from application 30 to application 28 beforehand, as illustrated in FIG. 2. However, optionally, the key sent from application 28 to application 30 in step 110 can be self authenticating based on the identity of the e-meeting that the user wishes to join, whether the period during which the key is valid matches the scheduled time of selected e-meeting, and whether the IP address of user 25 is from the Blue zone. If the key is considered self authenticating, then it need not be supplied from application 30 to application 28 in step 82, and the steps of FIG. 2 need not be performed at all. In step 114, application 30 checks the authentication of the key either by comparing the key to the key(s) supplied to application 28 in step 82 or checking the self authentication aspects. If the key is not authentic (decision 116), then application 30 notifies application 28 which handles the error, possibly by supplying another key or notifying the user of the problem (step 118). However, if the key is authentic, then application 30 joins user 25 to the meeting (or grants user 25 access to another application on server 40 as requested by the user 25 in step 108) (step 124 of FIG. 3(C)). Application 30 joins user 25 to the e-meeting by furnishing to the user 25 (along with the other authenticated participants) the presentation screens. After being joined to the meeting, user 25 can then participate in the meeting (126). In the case of a user who is not the leader, the user 25 participates by viewing the presentation screens on workstation 24 as they are chosen and advanced by the leader. The user also listens by telephone to a verbal presentation related to the presentation screens. In the case of a user who is the leader, the leader is originally "joined" to the e-meeting by setting up and scheduling the meeting. The set up includes a specification of which users are invited/authorized to participate in the meeting. Subsequently, during the actual meeting, the leader participates by selecting which screens are presented. The leader can also delegate the leadership role to another user. The participants will likely engage in verbal conversation during the presentation, and this is carried over the voice telephone connection. Also, optionally, there can be an IBM "Same Time" electronic connection or other messaging service that any of the participants can use during the meeting to send a message in real time to another participant including the leader.

Figure 3C:
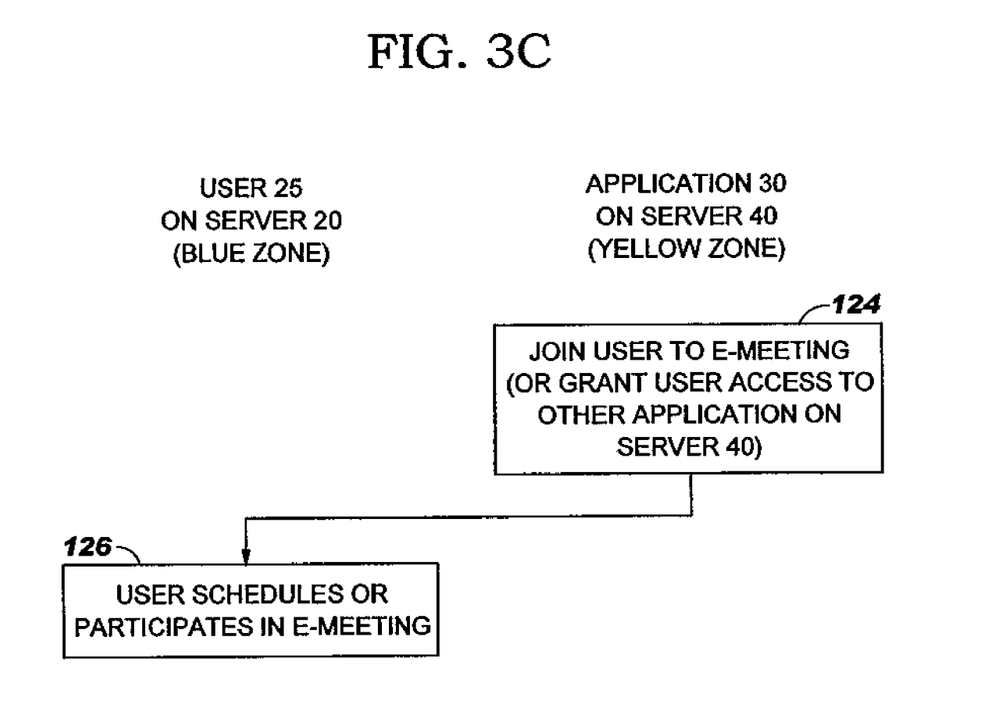

The leader, as a user, performed the steps illustrated in FIGS. 3(A), 3(B) and 3(C) twice, once to setup and schedule the meeting and again to join the meeting when it occurs. Because this typically occurs during different times and sessions, the leader must be authenticated to application 28 and application 30 twice, so the steps of FIGS. 3(A), 3(B) and 3(C) are typically performed twice for the leader.

Figure 4A:
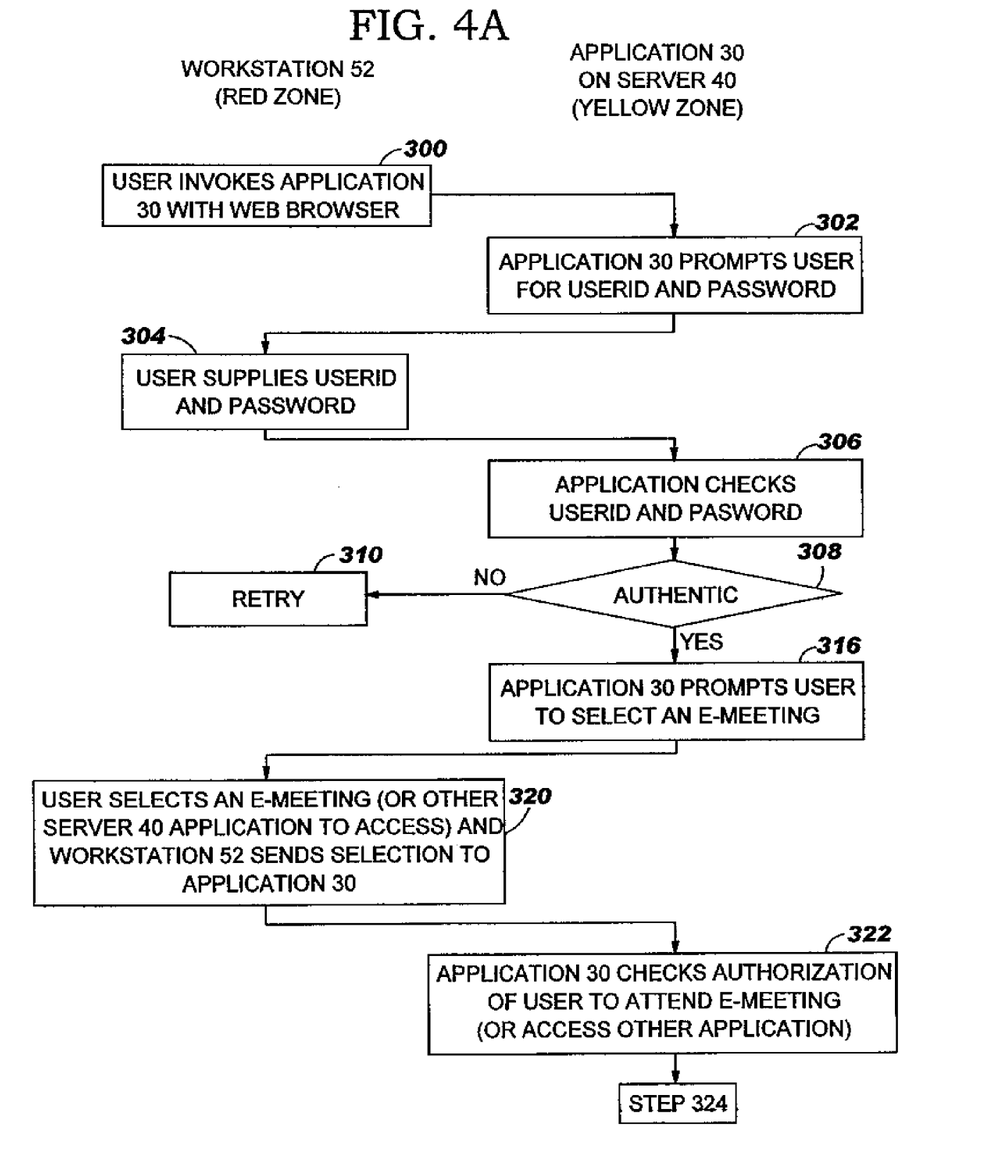
FIGS. 4(A) and 4(B) form a flow chart illustrating a process for a user in the Red zone to be authenticated with and use an application in the Yellow zone.
Figure 4B:
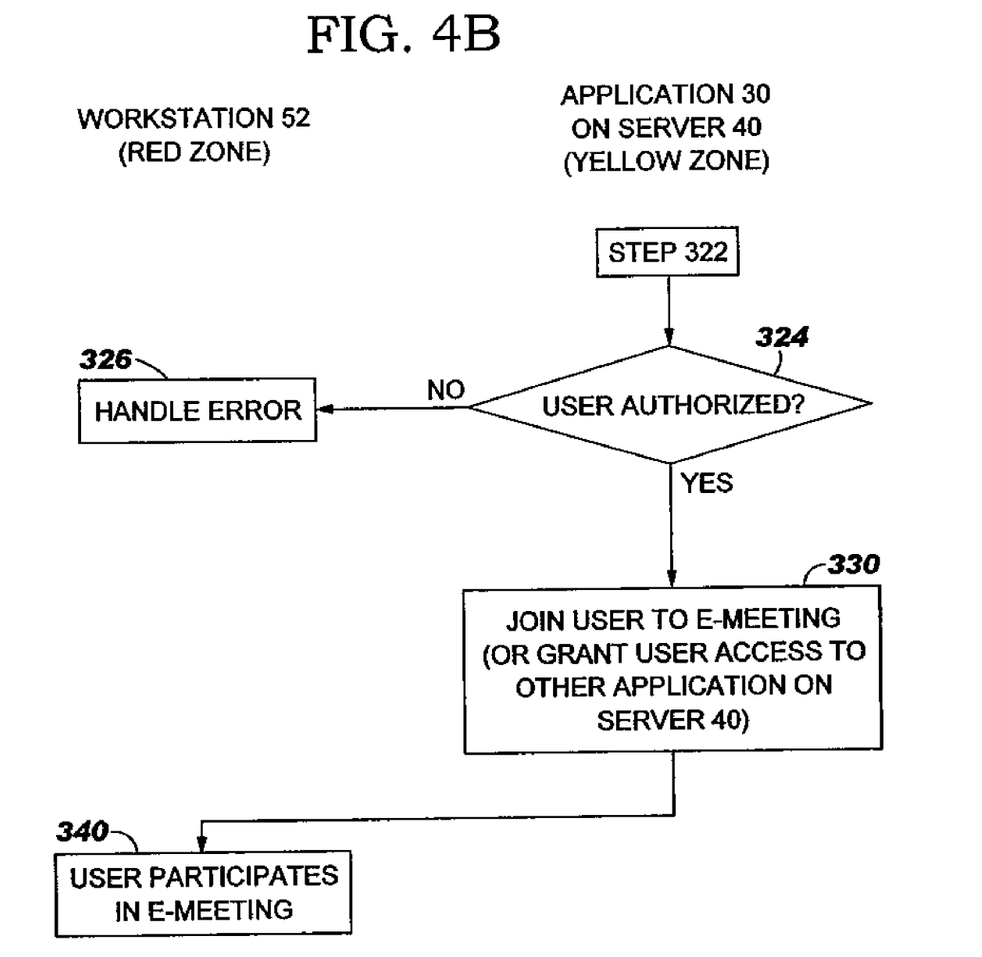

FIGS. 4(A) and 4(B) illustrate a conventional process to authenticate user 53 at work station 52 in the Red zone to application 30 in the Yellow zone. Initially, user 53, with a web browser, invokes application 30 either through a link or URL, for example, using HTTP protocol (step 300). In response, application 30 prompts user 53 for a userID and a password (step 302), and the user complies (step 304). Then, application 30 checks the combination of userID and password against a list in a database (decision 306). If the authentication fails (decision 308), application 30 notifies the user 53 who can then try another combination (step 310). If the authentication succeeds (decision 308), then application 30 prompts user 53 to select an e-meeting to join (or access another application on server 40 in the Yellow zone) (step 316). In response, the user 53 selects an e-meeting to join (or another application to access), and workstation 52 sends this selection along with the userID to application 30 (step 320). Then, application 30 checks the authority/right of user 53 to join the meeting by comparing the userID to the list of authorized participants specified earlier by the leader (step 322). If the user 53 is not authorized (decision 324), application 30 notifies workstation 52 which will display the error to the user 53 (step 326). However, if the user 53 is authorized to join the e-meeting, then application 30 joins user 53 into the meeting (step 330). Application 30 joins user 53 into the e-meeting by furnishing to the user 53 (along with the other authenticated participants) the presentation screens. Thereafter, user 53 can participate in the e-meeting by viewing the screen presentations (step 340). Also, user 53 will likely join in a conference telephone call to listen to the associated verbal presentation made by the leader, and converse with the leader if desired.

It is also possible for the leader of the e-meeting to reside in the Red zone, in which case the steps of FIGS. 4(A) and 4(B) would be performed twice for the leader, once to set up and schedule the meeting and again to lead the meeting. In such cases, step 340 of FIG. 4(B) would be modified accordingly.

Thus, one or more users in the Blue zone and one or more users in the Red zone can simultaneously participate in an e-meeting or other application in the Yellow zone, and the passwords of the users in the Blue zone are not sent to the Yellow zone or the Red zone. This prevents users from the Red zone, who have access to the Yellow zone but not the Blue zone, from learning the passwords of the users in the Blue zone.

Based on the foregoing, a technique to authenticate users from a protected network and an unprotected network to a shared application has been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method for authenticating a first user in a protected network to an application shared concurrently with a second user in an unprotected network, said method comprising the steps of:

the first user supplying a userID and a password to a first server within said protected network for authentication for said application, said application residing in a third network configured as a buffer between said protected network and said unprotected network;

said first server determining that said userID and password are authentic, and in response, said first server forwarding to said application an authentication key for said first user and a selection by said first user pertaining to said application, said password not being sent from said protected network into said third network to access said application;

said application determining that said key is authentic, and in response, said application complying with said selection by said first user; and said second user supplying another userID and another password to said application, said application determining that said other userID and said other password are authentic, and in response, said application complying with a selection made by said second user pertaining to said application.

2. A method as set forth in claim 1 wherein said application complies with said selection made by said second user without said second user supplying an authentication key to said third network.

3. A method as set forth in claim 1 wherein said protected network and said third network are both controlled by a same entity.

4. A method as set forth in claim 3 wherein said unprotected network is an Internet.

5. A method as set forth in claim 1 wherein said third network is a Demilitarized Zone ("DMZ") network and acts as a security buffer for said protected network.

6. A method as set forth in claim 1 wherein said unprotected network is an Internet.

7. A method as set forth in claim 1 wherein said selection by said first user is a request to said application, and said selection by said second user is a request to said application.

8. A method as set forth in claim 1 wherein said application is an electronic meeting application, both said first user and said second user concurrently participate in a same meeting, and said first user selects a screen that is concurrently presented to both said first user and said second user.

9. A method as set forth in claim 8 wherein said selection by said first user is a selection of an electronic meeting in which to participate.

10. A method as set forth in claim 1 further comprising the step of said application sending to said first server said authentication key before the step of said first server forwarding to said application said authentication key.

11. A method as set forth in claim 1 wherein said authentication key is self authenticating based on whether a period during which the key is valid matches a scheduled period of use of said application, and whether an IP address of said first user is from said protected network.

12. An authentication system comprising:
an application on a first server in a first network;
a second server in a second, protected network to receive from a first user within said second network a userID and a password for authentication for said application, said second server including means for checking authentication of said first user based on said userID and password, and if said first user is authentic, forwarding to said application an authentication key for said first user and a selection by said first user pertaining to said application, said password not being sent from said protected network into said first network to access said application; and
said application including means for checking authentication of said key, and if authentic, complying with said selection by said first user; and
a workstation in a third, unprotected network for a second user, said application being shared concurrently with said first and second users, said first network configured as a buffer between said second, protected network and said third, unprotected network; and wherein said application receives from said second user another userID and another password, and includes means for determining that said other userID and other password are authentic, and in response, complying with a selection made by said second user pertaining to said application.

13. A system as set forth in claim 12 wherein said application complies with said selection made by said second user without said second user supplying an authentication key to said first network.

14. A system as set forth in claim 12 wherein said first and second servers and said first and second networks are all controlled by a same entity.

15. A system as set forth in claim 12 wherein said first network is a Demilitarized Zone ("DMZ") network and acts as a security buffer for said protected network.

16. A system as set forth in claim 12 wherein said unprotected network is an Internet.

17. A computer program product for authenticating a first user in a protected network to an application shared simultaneously with a second user in an unprotected network, and authenticating said second user to said application, said program product comprising:
a computer readable medium;
first program instructions, for execution on a first server within said protected network, to receive from the first user a userID and a password for authentication for said application, said application residing in a third network configured as a security buffer between said protected network and said unprotected network;
second program instructions, for execution on said first server, to check authentication of said first user based on said userID and password, and if said first user is authentic, to forward to said application an authentication key for said first user and a selection by said first user pertaining to said application, said password not being sent from said protected network into said third network to access said application;
third program instructions in said application to check authentication of said key, and if authentic, comply with said selection by said first user;
fourth program instructions in said application to receive from said second user another userID and another password, determine if said other userID and other password are authentic, and if so, instruct said application to comply with a selection made by said second user pertaining to said application; and wherein
said first, second, third and fourth program instructions are recorded on said medium in functional form.

18. A computer program product as set forth in claim 17 wherein said application complies with said selection made by said second user without said second user supplying an authentication key to said third network.

19. A method for authenticating a first user of a first computer in a protected network to a second computer executing an application, a second user of a third computer in an unprotected network and said first user of said first computer concurrently sharing said application, said second computer residing in a third network configured as a buffer between said protected network and said unprotected network; said method comprising the steps of:
the first computer supplying a userID and a password of the first user to a fourth computer in said protected network for authentication for said application;
said fourth computer determining that said userID and password are authentic, and in response, forwarding to said second computer an authentication key for said first user, said password not being sent from said protected network into said third network to access said application;

said second computer determining that said key is authentic, and in response, complying with a selection by said first user pertaining to said application; and said third computer supplying another userID and another password of said second user to said second computer, said second computer determining that said other userID and said other password are authentic, and in response, said application complying with a selection made by said second user pertaining to said application.

20. A method as set forth in claim 19 wherein said application complies with said selection made by said second user without said second user or said third computer supplying an authentication key to said second computer or said third network.

21. A method as set forth in claim 19 wherein said protected network and said third network are both controlled by a same entity.

22. A method as set forth in claim 19 wherein said third network acts as a security buffer for said protected network.

* * * * *